3,536,755
PROCESS FOR PRODUCING ACETIC ACID BY CATALYTIC OXIDATION OF PROPYLENE

R Parthasarathy, Takoma Park, Md., and Robert M. Dobres, deceased, late of Silver Spring, Md., by Amalie B. Dobres, executrix, Silver Spring, Md., assignors to W. R. Grace & Co., New York, N.Y., a corporation of Connecticut
No Drawing. Filed Oct. 26, 1966, Ser. No. 590,157
Int. Cl. C07c 51/32
U.S. Cl. 260—533
6 Claims This invention relates to a process for the production of acetic acid by the catalytic oxidation of propylene with oxygen-containing gases with or without the presence of steam.

It is known that when propylene is oxidized in the vapor phase with oxygen-containing gases at elevated temperatures in the presence of catalysts such as bismuth molybdates, acrolein is obtained as the major oxidation product together with slight amounts of other products including acetaldehyde, acetic acid and acrylic acid up to a total amount of 10% in relation to the amount of converted propylene.

It has now been found that by reacting propylene with oxygen-containing gases in the vapor phase at elevated temperatures, in the presence of a catalyst consisting essentially of zinc oxide promoted cobalt-molybdenum oxides, a good yield of acetic acid is obtained. Thus acetic acid is normally the main oxidation product with small amounts of acrylic acid, acrolein, acetaldehyde, and formaldehyde. Accordingly, acetic acid, a valuable product in chemical industry is produced from a cheap and abundantly available raw material such as propylene.

In summary, the process of this invention is a method for the manufacture of acetic acid from propylene comprising reacting propylene with an oxygen-containing gas in the presence of a catalyst consisting essentially of zinc oxide promoted cobalt-molybdenum oxides having a zinc to molybdenum ratio of 0.01:1 to 0.5:1, and a zinc plus cobalt to molybdenum ratio of 0.1:1 to 1:1.

It is an object of this invention to provide a process for oxidizing olefins to form the corresponding carboxylic acids employing a novel catalyst.

It is another object of this invention to provide a method for oxidizing propylene to acetic acid employing a catalyst which provides good activity and selectivity for the production of acetic acid.

It is a still further object of this invention to provide a novel catalyst composition for the oxidation of olefins to the corresponding carboxylic acids.

In general, the process of this invention is carried out by contacting a gaseous mixture containing an olefin and oxygen containing gases with a catalyst to form the corresponding carboxylic acid.

The process of this invention is applicable to the oxidation of a wide variety of olefins such as propylene, butenes, and higher molecular weight homologs thereof to form the corresponding carboxylic acids. This process is particularly applicable to the oxidation of propylene to form acetic acid.

A gaseous mixture containing oxygen and the olefin to be oxidized is contacted with the catalyst. Air or other oxygen-containing gases can be employed as the oxygen source. If the olefin is propylene, the propylene concentration in the feed mixture should be from 1 to 20 mole percent propylene, and the oxygen to propylene mole ratio should be within the range of from 0.25 to 10:1. The remainder of the gas stream can comprise saturated hydrocarbons and inert diluent gases such as nitrogen and the like. For example, a gaseous mixture containing propylene, propane, and air can be employed as a feed in the process.

In a preferred embodiment of this invention, the gaseous feed contains steam. If the olefin is propylene, the water to propylene mole ratio should be within the range of from 1 to 20:1. The function of the steam is not clearly understood. It apparently acts as a moderator, increasing the selectivity of the catalyst to produce particular products.

The gaseous feed mixture can be contacted with the catalyst in either a fixed bed or a fluidized bed system. If a fixed bed reactor is to be employed, the catalyst is preferably in the form of pellets, pills, balls, extrudates, and the like having a size within the range of from 5 to 25 mesh (U.S. Sieve). For fluidized bed reaction systems, the catalyst can have a particle size within the range of from 10 to 200 microns and preferably within the range of from 50 to 100 microns.

The products of this reaction include carbon monoxide, carbon dioxide, the respective carboxylic acid, small amounts of unsaturated acid, saturated and unsaturated aldehydes together with any unoxidized olefin. The carboxylic acid product can be recovered from the reactor as effluent gas by conventional methods such as condensation, scrubbing with water or other suitable solvents, or compression followed by the subsequent expansion.

In investigating catalysts for this reaction, we have found co-precipitated cobalt-molybdenum oxide catalyst promoted with zinc oxide to be highly selective to acetic acid. The unpromoted catalyst was only 34% selective to acetic acid and 52% to carbon oxides.

However, introducing a small amount of the zinc oxide promoter in the preparation of cobalt-molybdenum oxide catalyst shifted the selectivity to acetic acid at the expense of the carbon oxides. The co-precipitated cobalt-zinc-molybdenum oxide catalyst converted 35% of the propylene charge at 700° F., was 60% selective to acetic acid, and only 6% to carbon oxides.

The zinc oxide promoted cobalt-molybdenum oxide catalyst employed in the process of this invention may be prepared by physically mixing the respective oxides or molybdates prepared in the usual manner. In the preferred process co-precipitation of the mixed oxides or the molybdates is achieved when a zinc solution is added to the cobalt solution and this mixture of salts is treated with ammonium molybdate solution. The precipitation is completed by adjustment of the pH. The resulting mixture is then dried, pilled if desired, and calcined.

The catalyst of this invention can also be formed by multiple impregnation of a inert porous support having sufficient porosity to provide the final surface area desired, such as a suitable silica gel, alumina or zirconia, titania and the like.

The preferred catalyst contains a cobalt to zinc ratio of 9 to 1. The amount of zinc present in the catalyst is critically important. Optimum yields of acetic acid are obtained when the gram atom of zinc to gram atom of molybdenum ratio in the catalyst is in the range of 0.05:1 to 0.25:1. The concentration of molybdate should also be controlled so that the cobalt plus zinc to molybdenum ratio is at least 0.1:1.

The temperature at which the reaction is to be conducted should be within the range of from 650 to 900° F. and preferably from about 700 to 850° F. For the production of acetic acid from propylene, a temperature of about 725° F. appears to be optimum.

The reaction is normally carried out at atmospheric pressure. However, gas pressures within the range of from 0.5 to 10 atmospheres can be employed.

The contact time of the gaseous mixture with the catalyst is important. One conventional measure of contact time is apparent contact time which is calculated by dividing the volume of catalyst in the reactor by the volume of gaseous feed per unit of time. An apparent contact time of from 1 to 20 seconds can be used, an apparent contact time of from 3 to 10 seconds being preferred.

The invention is further illustrated by the following specific but non-limiting examples.

EXAMPLE 3

The criticality of the zinc promoter was shown by passing the mixture of propylene, air and steam to the reactor in the presence of a cobalt-molybdate catalyst and also the catalyst prepared in Example 1. The data showing feed temperature, conversion, contact time, propylene conversion and selectivity of the conversion is set out in Table I below:

TABLE I

| Catalyst | Feed vol. percent, $C_3=$—Air—$H_2O$ | Temp., °F. avg. bed | Contact time, sec. | $C_3=$ conv. | Selectivity of conv. in percent to major product ||||
|---|---|---|---|---|---|---|---|---|
| | | | | | Percent acrolein | Acrylic acid | Acetic acid | Carbon oxides |
| $CoMoO_4$ | 5-50-45 | 660 | 3.6 | 27.0 | 0.3 | 9.7 | 33.8 | 52.4 |
| $CoMoO_4$ | 5-50-45 | 727 | 3.6 | 43.1 | 0.2 | 12.5 | 38.1 | 47.5 |
| Exp. 1 catalyst (Co-Zn-$MoO_4$) | 5-25-70 | 706 | 3.6 | 35.1 | 0.9 | 16.8 | 60.4 | 6.2 |
| Exp. 1 catalyst (Co-Zn-$MoO_4$) | 5-25-70 | 733 | 3.6 | 40.0 | 0.5 | 14.3 | 53.4 | 18.3 |

EXAMPLE I

This example describes the preferred method of preparing our zinc promoted cobalt-molybdate catalyst.

To 262 grams of cobalt nitrate, $Co(NO_3)_2 \cdot 6H_2O$, dissolved in 270 ml. of deionized water, was added a solution of 29.8 grams of zinc nitrate, $Zn(NO_3)_2 \cdot 6H_2O$ in 50 ml. of deionized water. The mixture was maintained at a temperature of 140° F. A charge of 177 grams of ammonium molybdate, $(NH_4)_6Mo_2O_{24} \cdot 4H_2O$, was dissolved in 200 ml. of deionized water. The solution was heated to 120° F. The ammonium molybdate solution was added to the cobalt-zinc solution with stirring. The temperature was maintained at 140° F. during this addition. The mixture thickened upon addition of the molybdate. The pH of the mixture was adjusted by adding 46 ml. of 50% ammonium hydroxide solution dropwise with stirring. The final pH was 6.4. The mixture was stirred an additional fifteen minutes, filtered and washed with 2 liters of deionized water. The filtrate was checked by adding additional ammonium hydroxide to be sure that precipitation was complete. The products were dried for 16 hours at 220° F. and calcined for 16 hours at 1000° F. The product was sized to recover those particles in the 6 to 25 mesh size range. The ratios of components in the products were as follows:

Cobalt ........................................ 0.9
Zinc .......................................... 0.1
Molybdenum .................................... 1.0

EXAMPLE 2

A mixture of propylene, air and steam containing a volume percent ratio of propylene to oxygen and steam of 7.5 to 37.5 to 55 was passed through a bed of a cobalt-zinc-molybdenum oxide catalyst having a cobalt to zinc ratio of 9 to 1, prepared as in Example 1. The system was operated at a temperature of 733° F. and a pressure of one atmosphere. The contact time was 3.6 seconds, and the GHSV was 1000 (volume of feed per hour per volume of catalyst). The reactor effluent was recovered and analyzed. The propylene conversion was 40% with a selectivity to acetic acid (acetic acid yield based on converted propylene) of 53.4 and to acrolein of 0.5%. The selectivity for acetaldehyde was 8.5%, and for carbon oxides, 18%.

It is apparent from review of these data that the zinc promotion of the catalyst is critically important. A fresh cobalt-molybdate catalyst has a selectivity for acetic acid of only 33.8%. However, when the cobalt-zinc molybdate catalyst of this invention was introduced into the reactor, the propylene conversion increased to 35% with the acetic acid conversion increasing to 60.4%. The use of the cobalt-zinc-molybdate catalyst also resulted in a reduction of the carbon oxide selectivity of the conversion to 6.2%

When we use the term "selectivity" to acetic acid and to carbon oxides based on propylene charge, we mean the number of moles of acetic acid and carbon oxides respectively produced, multiplied by 100, divided by the number of moles of propylene in the charge converted.

Obviously many modifications and variations of the invention may be made without departing from the essence and scope thereof and only such limitations should be applied as are indicated in the appended claims.

What is claimed is:

1. A process for the manufacture of acetic acid from propylene comprising reacting propylene with an oxygen-containing gas in the presence of a catalyst consisting essentially of a zinc oxide-promoted cobalt-molybdenum oxide catalyst, wherein the gram atom ratio of zinc to molybdenum is 0.05 to 0.25, and the gram atom ratio of cobalt plus zinc to molybdenum is 0.1 to 1.0.

2. The process of claim 1 wherein the gram atom ratio of zinc to molybdenum is 0.1, and the gram atom ratio of cobalt plus zinc to molybdenum is 1.0.

3. The process of claim 1 wherein the reaction is conducted in a fixed bed reactor containing a bed of granular catalyst.

4. The process of claim 1 wherein the reaction is conducted in a fluidized bed reactor containing a bed of fluidized catalyst.

5. The process of claim 1 wherein the oxygen-containing gas is air.

6. The process of claim 1 wherein steam is used as a moderator.

References Cited

UNITED STATES PATENTS 3,409,665  11/1968  Brown et al. ........ 260—530

LORRAINE A. WEINBERGER, Primary Examiner